Figure 1:
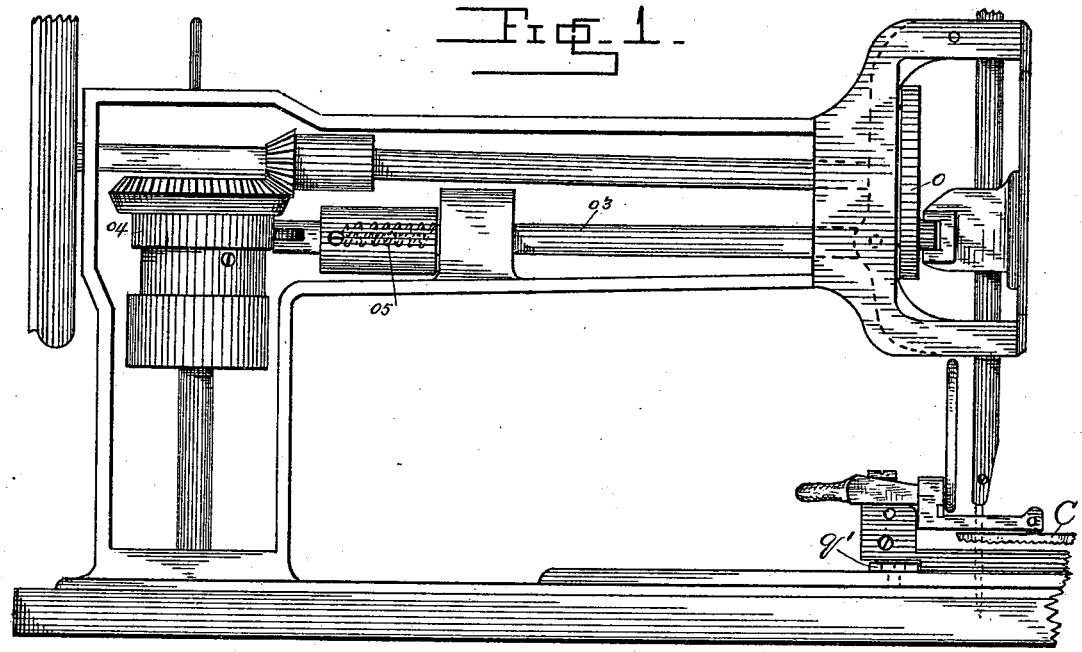

(Model.) 5 Sheets—Sheet 1.

A. HELWIG.
MACHINE FOR MAKING BUTTON HOLES.

No. 350,364. Patented Oct. 5, 1886.

WITNESSES:
Jos. H. Blackwood
R. G. Du Bois

INVENTOR:
Arthur Helwig
by Wm. H. Doolittle
Attorney.

(Model.)  5 Sheets—Sheet 2.

A. HELWIG.
MACHINE FOR MAKING BUTTON HOLES.

No. 350,364.  Patented Oct. 5, 1886.

Witnesses:
J. H. Blackwood
R. G. Du Bois

Inventor:
Arthur Helwig
by W. H. Doolittle
Attorney (Model.)                                      5 Sheets—Sheet 3.
A. HELWIG.
MACHINE FOR MAKING BUTTON HOLES.

No. 350,364.                                  Patented Oct. 5, 1886.

Witnesses:                                    Inventor:
J. M. Blackwood,                              Arthur Helwig
Robt. B. Lines                                by W. H. Doolittle
                                              Attorney

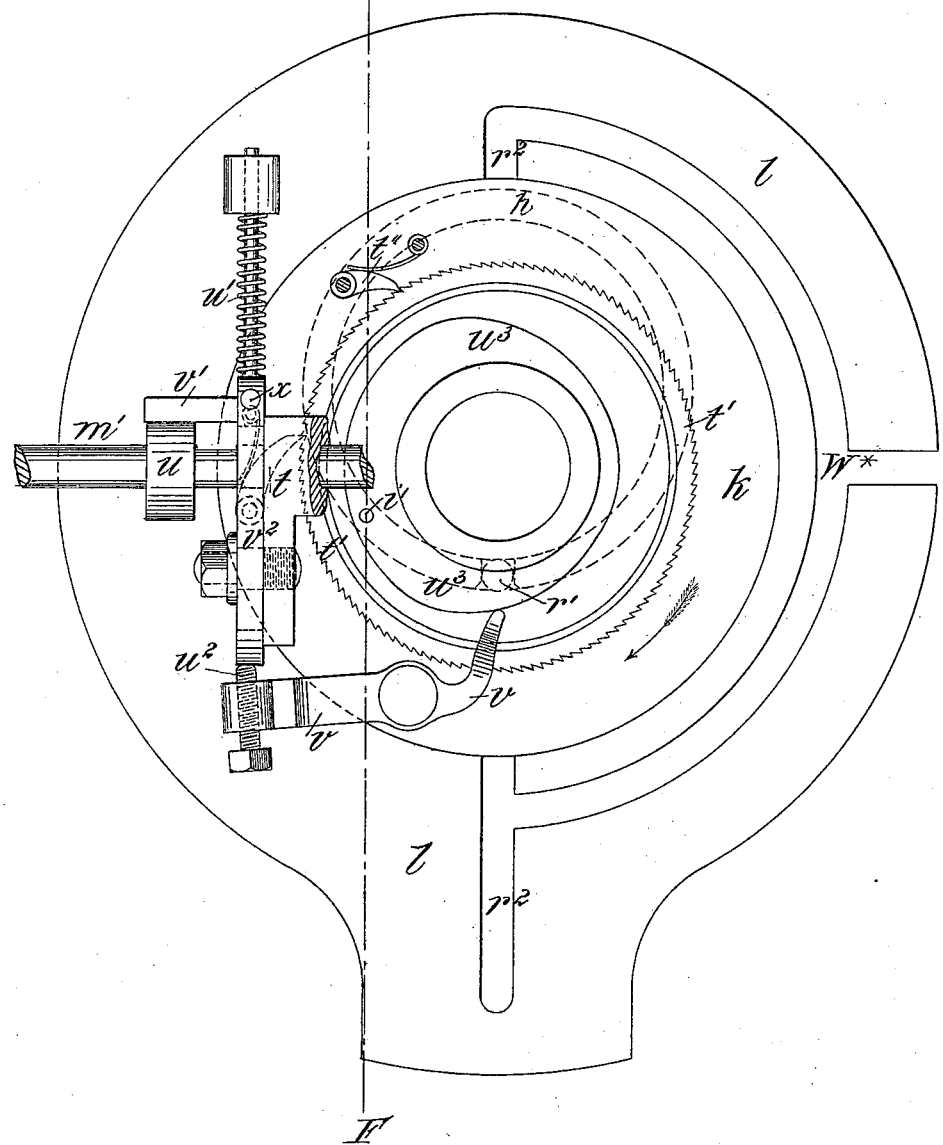

(Model.)  A. HELWIG.  5 Sheets—Sheet 5.
MACHINE FOR MAKING BUTTON HOLES.
No. 350,364. Patented Oct. 5, 1886.
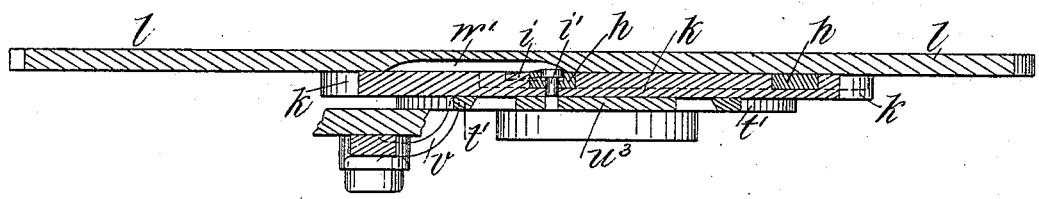
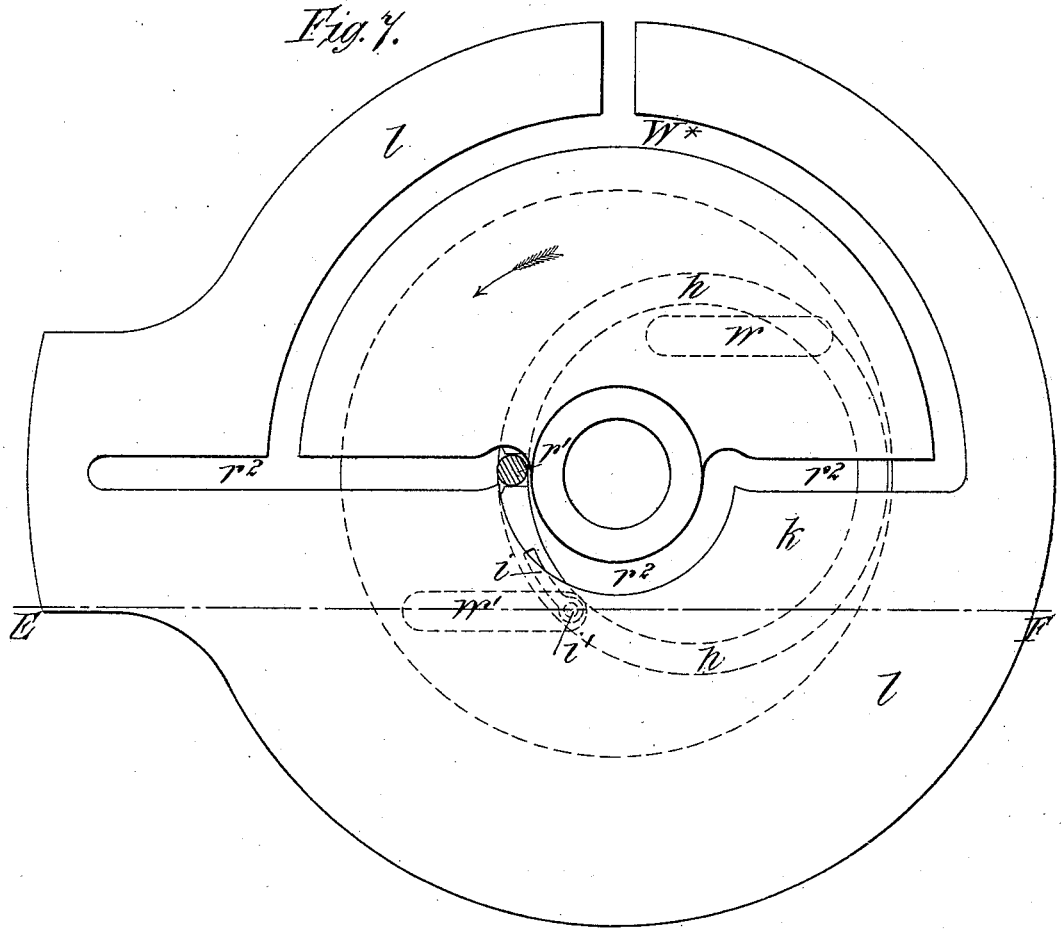

United States Patent Office.

ARTHUR HELWIG, OF LONDON, COUNTY OF MIDDLESEX, ENGLAND, ASSIGNOR TO JULIAN HOFFINGER, OF SAME PLACE.

MACHINE FOR MAKING BUTTON-HOLES.

SPECIFICATION forming part of Letters Patent No. 350,364, dated October 5, 1886.

Application filed December 1, 1883. Serial No. 113,343. (Model.) Patented in England December 15, 1881, No. 5,493; in France July 16, 1883, No. 156,566, and in Belgium July 17, 1883, No. 62,043.

*To all whom it may concern:*

Be it known that I, ARTHUR HELWIG, a subject of the Queen of Great Britain and Ireland, residing at Hunter Street, London, in the county of Middlesex, Kingdom of Great Britain and Ireland, have invented a new and useful Improved Machine for Making Button-Holes and the Like, (for part of which, in conjunction with James Dewdney, deceased, I have obtained a British patent, No. 5,493, dated December 15, 1881,) of which the following is a specification.

My invention, illustrated in the accompanying drawings, Figures 1 to 9, has reference to button-hole-making machines constructed with a die or cutter, $a$, and cutter-block $b$, for cutting the hole, sewing mechanism for securing the edges of the hole, and a traveling clip or holder, $c$, that holds the material during the cutting and sewing operation.

In this machine the clip or holder $c$, that carries the material to be operated upon, is worked by means of a cam or eccentric, whose axis of rotation is coincident with the axis of the sewing-needle. There is a central stud or pivot, through which the sewing-needle passes, and about which the clip or holder turns, and the stud or projection on the clip or holder works in a guiding-slot in the base-plate or table of the machine, as more fully described below.

The die or cutter $a$ is operated by a screw, $d$, supported in a bracket or frame, $e$, and the said screw forces the die or cutter through the cloth, the cutting being effected against the cutter-block $b$, which is carried by an arm, $f$, that is held against the pressure of the die $a$ by a catch, $g$, as shown.

In order to insure that the clip or holder $c$ shall be accurately turned during the formation of the larger or pear-shaped end of the button-hole, there is combined with the clip or holder $c$ (which holds and carries the material to be operated upon) and with the eccentric-strap $h$ a spring-catch, $i$, capable of being pressed at the proper times into a hole or recess in the eccentric $k$, as more fully described below.

Figure 8:
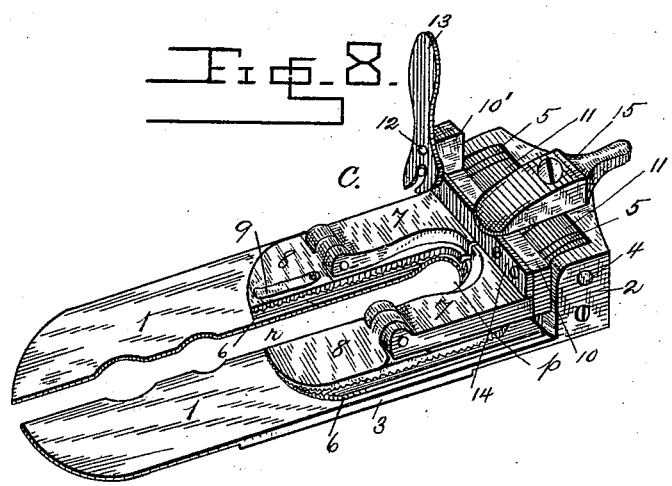
Figure 9:
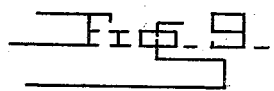
Figure 2:
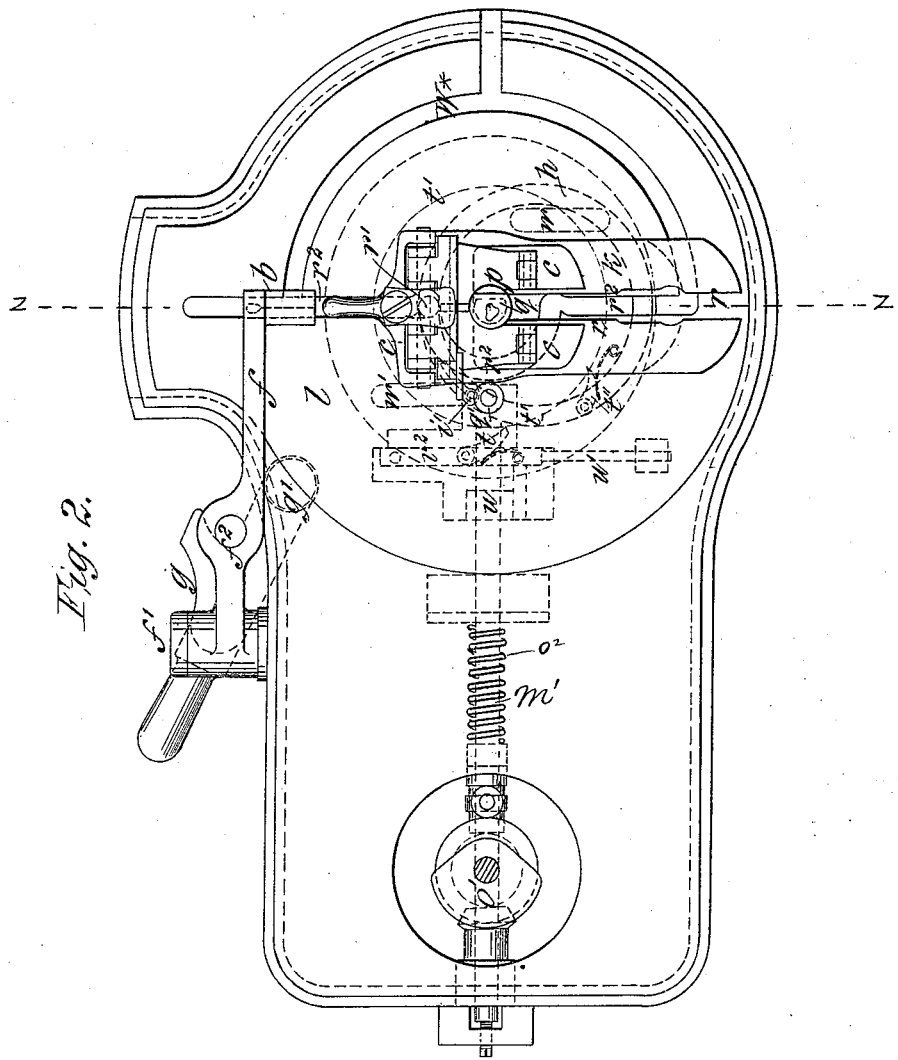
Figure 3:
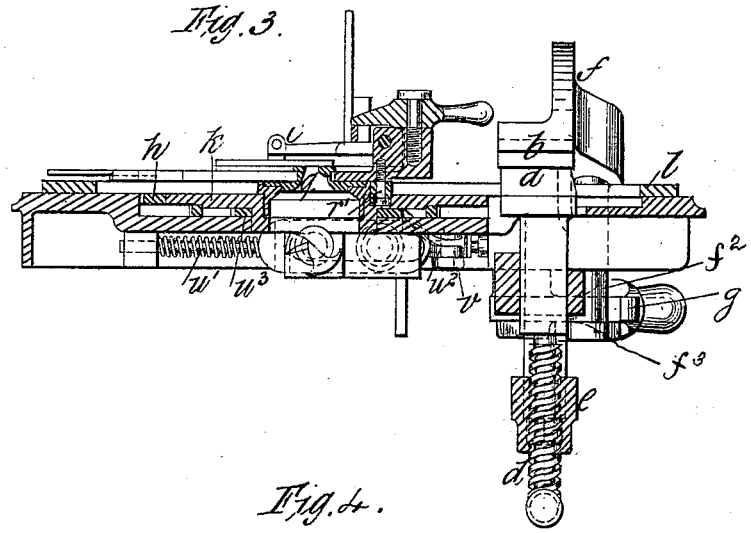
Figure 4:
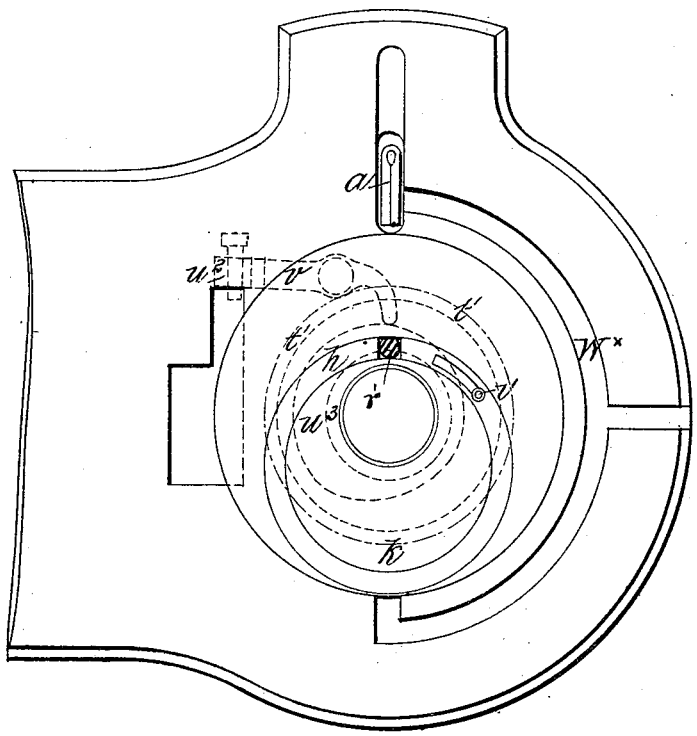

Fig. 1 of the drawings is a side elevation of the machine, with one side broken away to show the needle-operating mechanism, and also with the clip or holder in place. Fig. 2 is a plan view with the goose-neck removed. Fig. 3 is a section on the line $zz$, Fig. 2. Fig. 4 is a plan with plate $l$ removed, showing the mechanism whereby the clip or holder is worked. Fig. 5 is a bottom plan view. Fig. 6 is a horizontal section in the line E F of Figs. 7 and 5. Fig. 7 is a plan of the top plate, $l$, hereinafter more particularly explained. Fig. 8 is a perspective view of the clip or holder. Fig. 9 is a plan view of the stud around which the clip or holder travels.

$a$ is the die; $d$, the screw that operates the die; $f$, the arm that carries the cutter-block. The arm $f$ turns on a center at $f'$. From the arm $f$ there projects downward a rod or pin, $f^2$, with a head or flange at $f^3$, and when the parts are in the position represented in the drawings the forked portion of the catch $g$, Fig. 2, being over the flange $f^3$, Fig. 3, prevents rising of the arm $f$. The normal position of the die $a$ is with its cutting-edge below the level of the table $l$, and it is forced upward through the cloth, when required, by the screw $d$. Both the needle and the looper have a swinging or side-to side motion, so that two parallel lines of stitches are formed, one in the cloth and the other in the slit of the button-hole.

$n$ is the needle-bar, fixed in a pivoted frame in the head, as shown in dotted lines, Fig. 1.

$o$ is a cam for operating the needle-bar.

$o'$ is a cam for operating the hook-shaft $m'$ endwise.

$o^2$ is a spring for returning the hook-shaft after it has been moved forward by cam $o'$.

$o^3$ is a shaft for vibrating the needle-frame. The rear end of this shaft is provided with a friction-roll, which engages with a cam, $o^4$, for giving the shaft its forward movement, and it is also provided with a coil-spring, $o^5$, for returning it.

For automatic button-hole-sewing the cloth is placed in the clip $c$. This clip, which is shown in Fig. 8, consists of a metal plate, 1, formed integral with the back 2. The plate 1 is thicker at its longitudinal central portion than at its ends, as seen at 3; and the ends of this thickened portion are rounded, so that the clip may be properly guided against the stud $q$ while the button-hole is being sewed. From the bottom of this thickened portion, at its inner end, extends stud $r'$, (not seen in Fig. 8,) for engagement with the eccentric-strap $h$. In the back 2 are pivoted by a rod, 4, two ears, 5, from the bottom of each of which and lying on plate 1 extends a serrated plate, 6.

7 7 represent two arms, each provided with a hinged presser-plate, 8, to one of which is secured a small spring-plate, 9, for holding the end of the thread after it is passed through the needle. These arms are each secured to a back piece, 10 10', having lugs 11, by which they are pivoted in ears 5. The back pieces are inclined or wedge-shaped on their upper side, and one of them, 10', has a vertical projection at its outer end, to which is pivoted, at 12, a lever, 13, the lower end of the lever being slotted to take over a pin in the end of a face-piece, 14, riveted to back piece 10, so that by moving lever 13 sidewise arms 7 7 are moved from or toward each other, in order to stretch the cloth or to relieve it from tension. The lever 13, when moved backward, rocks the back pieces, 10 10', together with the attached arms 7 7, on the rod 4, whereby the presser-plates are raised from the cloth.

15 represents a pivoted catch, which, when turned into operative position, bears upon the back pieces, 10 10', of the arms 7 7, and also upon the face-piece 14, to hold the presser-plates 8 down into their cloth-stretching condition.

$p$ is a slot in the clip. It has the form of a button-hole and holds the fabric securely round the lines of stitching. This clip (and consequently the cloth held by it) is moved and guided as follows: Upon the face-plate or table $l$ and immediately under the needle there is a stud or projection, $q$, pierced with a slot for the passage of the needle. This projection constitutes a fixed guide or pivot, which is embraced by a slot, $r$, in the lower plate of the above mentioned clip.

$q'$, Figs. 1 and 2, is a roller on the plate or table. It bears against the edge of the clip and assists in guiding it, especially at the time when the pear-shaped portion of the button-hole is being sewed. In the under side of the clip there is also a stud or projection, $r'$, which engages in a slot, $r^2$, of special form, cut in the plate or table of the machine. This slot consists, as shown, principally, of two straight portions and a curved portion, so arranged with relation to the above-mentioned slot $r$ and two studs or projections, $q$ and $r'$, that if the clip be impelled from the operator it will first travel along a straight line, then commence to rotate in a circular or nearly circular arc around a point in the center of the pear-shaped end of the button-hole, and, finally, after having turned end for end, will proceed in a straight line in the same direction in which it is started. The effect of this motion of the clip is to carry the fabric, first, along a straight line corresponding to one side of the button-hole, then in a circular or pear-shaped curve corresponding to the end of the button-hole, and, finally, along another straight line parallel to the first, and corresponding to the other side of the button-hole.

By varying the form or configuration of the guiding-slots and the disposition of the studs the stitching can be made to describe other forms than those of the ordinary button-hole.

The impelling-power is applied to the clip through the above-mentioned stud or projection $r'$, fixed in the clip. This stud projects through the slot $r^2$ in the plate or table $l$, and engages with the strap $h$, surrounding an eccentric, $k$, or lying in an eccentric groove placed horizontally below the said plate or table. This eccentric $k$ is driven by a pawl, $t$, and ratchet-wheel $t'$ at varying speeds, depending upon the number of teeth the pawl moves over at each stroke. The movement of the pawl in the forward or acting direction is caused by a cam, $u$, on the hook-shaft, while its backward motion results from a spring, $u'$, and is limited by a stop, $u^2$. The position of the stop is regulated by a cam, $u^3$, on the back of the eccentric, acting through a lever, $v$, or other suitable mechanism. It is necessary that the speed of the feed—that is, the stroke or throw of the pawl—should be varied to compensate for the varying angle of the eccentric with relation to the path of the stud on which it acts.

The bottom plan, Fig. 5, shows the plate $k$, forming the eccentric, and the ratchet-wheel $t'$, fixed thereto; also the means whereby the pawl $t$ actuates the eccentric through the said ratchet-wheel. It also shows the cam $u^3$ and the means whereby the length of stroke of the pawl is regulated. As will be seen, upon the hook-shaft $m'$ being revolved, the cam $u$, bearing against the projection $v'$ on the slotted slide $v^2$, will move the slide, together with the pawl $t$, fixed thereto, in its forward or acting direction, thereby turning the ratchet-wheel $t'$. The length of stroke of the slide $v^2$ is regulated by means of the cam $u^3$, lever $v$, and stop-piece $u^2$, the curved end of the lever bearing against the surface of the cam. In the position of the parts shown in Fig. 5 the stop-piece $u^2$ prevents the slide $v^2$ being forced back by the spring $u'$ to its fullest extent; but as the cam $u^3$ revolves in the direction shown by the arrow its smallest radius comes opposite the end of the lever $v$, thereby allowing the stop-piece $u^2$ to be free of the slide $v^2$, and permitting of the said slide being forced back by the spring $u'$ to such an extent as the smallest radius of the cam $u$ will allow, thus allowing the slide $v^2$ to perform its full stroke; and this obtains when the pear-shaped end of the button-hole is being sewed. The pawl $t''$ is carried by the bed of the machine, upon which the eccentric $k$ revolves.

Into the eccentric-strap $h$ is fixed a spring, $i$, (see Fig. 6,) having at its free end a pin or projection, $i'$, passing through a hole in the strap $h$ and into a hole or recess in the eccentric $k$ when the eccentric is locked to the said strap for the purpose of carrying it round with it.

In the under side of the plate or table $l$, and parallel to the slot $r^2$, are cut two recesses, $w$ and $w'$, with one or other of which the upper side of the spring $i$ engages while the straight part of the button-hole is being sewed.

The plan (Fig. 7) of the top plate, $l$, shows the positions of the recesses $w\ w'$, formed in the under side of said plate.

The operation is as follows: The clip $c$, carrying the material in which the button-hole has been punched by the die $a$, is carried along the straight part of the slot $r^2$ by the stud $r'$, taking into the eccentric-strap $h$ while one side of the button-hole is being sewed. During this operation the upper part of the spring $i$ enters the recess $w'$, thereby raising the pin or projection $i'$ out of the hole or recess in the eccentric $k$ and disengaging the strap $h$ therefrom, so as to allow of the eccentric revolving without carrying the strap with it. As the clip $c$ travels along the straight part of the slot $r^2$, so the free end of the spring $i$ travels along in the recess $w'$, which is made of such a length that as the clip arrives at the end of the straight part of the slot $r^2$ the spring $i$ also arrives at the end of the recess $w'$. The recesses $w$ and $w'$ are formed with inclines at their ends, as shown in Fig. 6, so that as the spring $i$ arrives at the end of a recess it is forced down by the inclined end into the strap $h$, while its pin or projection $i'$ enters the hole or recess in the eccentric $k$, thereby locking the strap to the eccentric, so that as the eccentric revolves it carries round with it the strap and clip, the stud $r'$ traversing the circular part of the slot $r^2$. As the stud $r'$ travels along the circular part of the slot $r^2$, the pear-shaped end of the button-hole is being sewed, and upon arriving at the other straight part of the slot $r^2$ the free end of the spring $i$ enters the other recess, $w$, thereby disengaging the strap $h$ from the eccentric and permitting the clip $c$ to travel along the straight part of the slot $r^2$ while the other side of the button-hole is being sewed. The recesses $w\ w'$ are formed, by preference, with their sides as well as their ends beveled off, so as to allow of the free entrance of the spring $i$ into them. The clip is brought to its first position by the eccentric being rotated by hand through the pin or projection $x$, fixed to the slotted slide $v^2$, the stud or projection $r'$ on the clip traversing a special return-groove, $w^x$, provided for the purpose.

It will be obvious that the details of the machine may be considerably varied without departure from the principles of my invention.

By providing an ordinary feed-motion my improved machine, when not required for making button-holes, may be employed for other purposes.

What I claim is—

1. In a machine for making button-holes, the combination, with sewing mechanism for sewing the edges of a button-hole and a traveling clip or holder, of the die or cutter $a$, operating-screw $d$, cutter-block $b$, arm $f$, with flanged rod or pin $f^2$, and catch $g$, all as described and shown.

2. In a machine for making button-holes, the combination, with the clip or holder $c$, that holds and carries the material to be operated upon, of an eccentric-strap, $h$, a spring-catch, $i\ i'$, and a rotating eccentric, $k$, with holes or recesses into which said spring-catch is capable of being pressed, so as to cause said clip or holder $c$ to be accurately moved while forming the larger or pear-shaped end of the button-hole, substantially as described.

3. In a machine for making button-holes, the combination, with a clip or holder for carrying the material to be operated upon, of mechanism for governing the movements of the clip, consisting of an eccentric, as $k$, provided with a toothed wheel, as $t'$, an eccentric-strap, as $h$, with which a stud on the clip engages, a cam, as $w^3$, a bent lever, as $v$, a slide, as $v^2$, carrying a pawl for engagement with the toothed wheel, and mechanism, substantially as described, for actuating the slide.

ARTHUR HELWIG.

Witnesses:
F. J. BROUGHAM,
C. E. BROUGHAM,
*Both of 46 Lincoln's Inn Fields, London.*